Jan. 17, 1939.  B. R. GRANBERG  2,144,490
ROTARY WORK SUPPORT FOR A MACHINE TOOL
Filed July 15, 1937
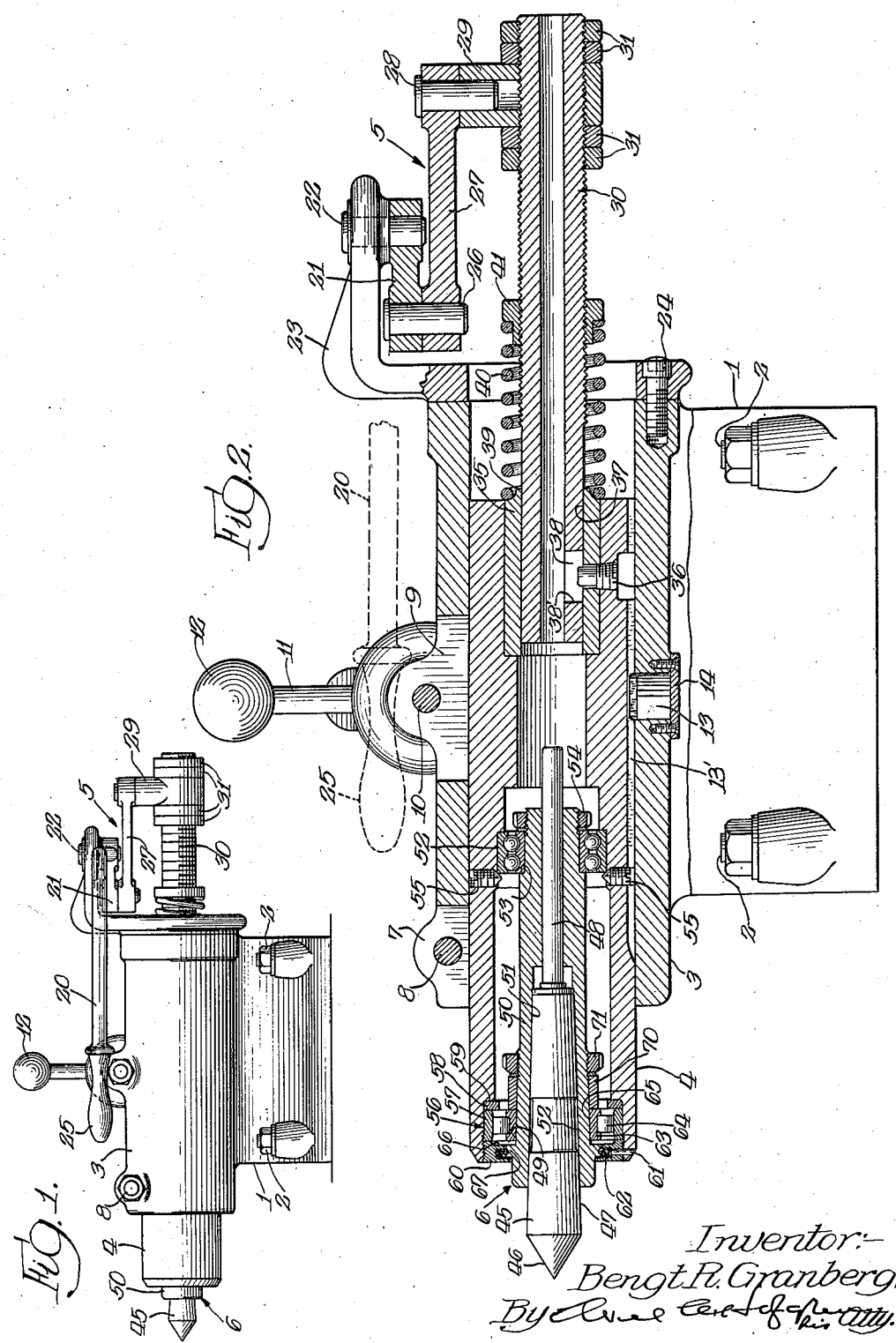
Inventor:-
Bengt R. Granberg,
By his Atty.

Patented Jan. 17, 1939

2,144,490

UNITED STATES PATENT OFFICE 2,144,490

ROTARY WORK SUPPORT FOR A MACHINE TOOL

Bengt R. Granberg, Rockford, Ill., assignor to Sundstrand Machine Tool Co., Rockford, Ill., a corporation of Illinois Application July 15, 1937, Serial No. 153,808

5 Claims. (Cl. 82—33)

My invention relates to machine tools, and particularly to an accurately positionable and centerable tailstock therefor.

One object of my invention is the provision of a new and improved rotatable work support for use on a machine tool.

Another object is the provision of a new and improved adjusting device for precisely alining a center in the tailstock of a machine tool.

Still another object is the provision of a tailstock for a machine lathe provided with a new and improved device for precisely adjusting a bearing by means of which a rotatable center pin is mounted therein in such a manner that the center pin may always be adjusted in precise alinement when the lathe is assembled.

A further object is the provision of a tailstock for a lathe having a center mounted therein provided with a means for accurately alining said center consisting of an adjustable bearing device and a shiftable collar designed to adjust the bearing device by altering the amount of clearance present between movable portions of said device by physically expanding one of said portions.

Further objects and advantages will appear as the description proceeds, taken in connection with the accompanying drawing which forms a part of this application.

Fig. 1 is a side elevation of a tailstock provided with the centering adjustment; and Fig. 2 is a longitudinal section of the tailstock on a larger scale.

While I have shown in the drawing and will herein describe in detail the preferred embodiment of my invention, it is to be understood that I do not thereby intend to limit the invention to the specific form disclosed, but aim to cover all modifications and alternative constructions falling within the spirit and scope of the invention as expressed in the appended claims.

In machine tools, and especially in lathes wherein the work piece must be mounted in the machine for rotation during the cutting stroke, it is essential for fine and precise operation, that the work be centered with extreme accuracy and maintained so during the machining operation. Although centering means have been devised which operate to hold the work in alinement, there are always inaccuracies present in the parts from which a machine is made up which must be compensated for on assembly in order that the finished product be an accurate working device.

The problem encountered here is not one of centering a work piece in a rough and ready way acceptable for ordinary work, but rather one of precisely and accurately locating and centering a work piece in machine tools of all sizes with such precision that any minute variation from perfect adjustment which might remain is of a negligible quantity. Furthermore, the adjustment must be sufficiently rugged so that it will hold its accurate position when used repeatedly for production purposes over a long period of time.

The invention is embodied in a tailstock, designed for use with a lathe or similar machine tool, which can be stationarily mounted upon the frame of the tool by suitable studs. The frame so mounted has reciprocally located within it a casing housing the centering elements of the device which acts as a carriage for those parts so that they can be moved back and forth within the frame in response to action of suitable lever means at one end thereof. The centering elements, located at the other end of the casing, are adjustable and consist primarily of a center pin, sometimes called merely a center, carried by a sleeve which in turn is journaled upon a set of bearings so that the entire device is allowed to rotate. The precise centering adjustment forming a part of this invention is embodied in one of the bearing means within which the centering device is journaled.

As shown in the drawing, the frame 1 is designed to be secured to a machine tool of the conventional sort by means of studs 2 located in the base. Above the base, the frame is constructed in the form of a hollow cylindrical portion 3 within which is mounted a casing 4 which is adapted to reciprocate longitudinally within the cylindrical portion. An adjusting mechanism designated generally 5 and located at the rear or right hand end of the machine, as viewed in Fig. 2, is used for moving the casing in and out, as the occasion requires. At the end of the casing, opposite from the adjusting mechanism 5, there is positioned a centering device designated generally 6 which rotates in fixed position within the casing, but moves longitudinally with it.

At the top of the cylindrical portion of the frame adjacent the left end, there is a split section 7 within which is located a bolt 8 designed to draw together the opposite sides of the split section in order to provide a snug sliding fit for the casing 4, so that there will be no play or vibration between the two parts. Near the center also of the cylindrical portion 3, there is another split section 9 provided with a bolt 10 which is manually adjustable by means of a lever 11 topped by a handle 12, the lever being cammed to the bolt in such a manner that the cylindrical portion of the frame can be tightened upon the casing 4 quickly and conveniently in order to secure it in any desired position. At the bottom of the cylindrical portion of the frame there is provided a plug 13 closed by a cap 14 engaging a slot 13' running longitudinally of the casing 4 to prevent the casing from rotating with respect to the cylindrical portion 3.

In order to reciprocate the casing quickly and conveniently within the bore of the cylindrical portion 3, the adjusting mechanism 5 has been provided. This mechanism consists of a lever constructed in the general form of a bell crank lever having one long arm 20 and another short arm 21. The bell crank is pivoted by means of a pin 22 to a flange 23 rigidly secured to the cylindrical portion 3 by means of the screws 24. The long arm 20 is provided at the free end with a handle 25, while the free end of the short arm 21 is pivoted by means of a pin 26 to a link 27 the opposite end of the link 27 being pivoted by means of a pin 28 to an adjustable bushing 29. In turn, the bushing 29 is threadedly mounted upon a hollow shaft 30 connected with the casing 4, and lock nuts 31 are provided in order to secure the bushing 29 in any desirable position along the hollow shaft 30.

For cushioning the effect of the adjusting mechanism 5, the hollow shaft 30 has a resilient connection with the casing 4. This consists of a tubular member 35 secured within the adjacent end of the casing 4 by means of a short screw 36 which protrudes a short distance into an inner bore 37 of the tubular member. The bore 37 is of such a size that it snugly accommodates the cylindrical end of the hollow shaft 30, permitting a free, slidable motion between the two. The said cylindrical end of the hollow shaft is provided at one side with a slot 38 into which the screw 36 projects, the slot, however, being considerably longer than the diameter of the screw.

At the end of the tubular member 35 which protrudes outward from the casing 4, there is an annular projection 39 about which is positioned a coiled spring 40 which is held in place by an adjustable nut 41 on the hollow shaft designed to increase or decrease the tension upon the spring as desired by being screwed longitudinally along the shaft.

By operation of the mechanism just described, it will become apparent that by swinging the handle 25 back and forth, the link 27 will serve to force the hollow shaft 30 in and out in an axial direction only. It will also become apparent that when the shaft is moved inward, due to the length of the slot 38, the pressure will first be taken up by the spring 40 by which action the casing 4 will be held resiliently in a forward position when pressed against a work piece mounted in the machine adjacent the opposite end. When the adjusting mechanism is released drawing the hollow shaft 30 outward, it will first be necessary to release the tension on the spring 40 before the inside end 38' of the slot 38 slides into contact with the upward projecting tip of the screw 36, in order to draw the casing away from a work holding position, a direction from left to right, as viewed in Fig. 2.

The centering device 6 at the opposite end of the casing 4 is provided with a center pin 45, which has a point 46 at one end for supporting a work piece in the customary manner, and a long tapered portion 47 at the other end extending into the casing, and adjoining the center pin at the inside end is a knock out pin 48. The tapered centering pin 45 is designed to be mounted within a sleeve 50 which has a correspondingly tapered inner bore 51 in which the centering pin is positioned, there being provided an annular recess 52 approximately midway of the long tapered portion 47 of the centering pin to facilitate more accurate positioning of the two parts and to permit them to be more easily separated, one from the other, when the knock out pin 48 is driven against the centering pin to release it.

For rotatably mounting the sleeve 50 within the casing 4, there is at the inside end a thrust bearing 52 secured against a shoulder 53 formed on the sleeve by means of a nut 54. The thrust bearing, together with the sleeve is held firmly within the casing by means of the set screws 55, whose tapered ends have a direct contact with the thrust bearing.

At the outer end, the sleeve 50 is journaled within the casing 4 by means of an adjustable centering bearing 56 comprising an outer ring 57 firmly secured together with an annular ring 58 to a shoulder 59 in the casing by means of a bearing nut 60 which is pinned in position by a pin 61. It should also be noted that a suitable packing 62 is provided within the bearing nut in order to seal a lubricant within the device. The bearing is also provided with an inner ring 63 separated from the outer ring by the rollers 64 in such a manner that there is a slight clearance between the movable parts of the bearing. The inner surface or bore 65 of the inner ring is tapered to correspond with an adjacent tapered portion 49 of the sleeve 50, the diameter of the inner surface 65 being sufficiently small so that when the tapered portion of the casing is inserted within it, a narrow space 66, to allow for longitudinal movement, remains between the left hand face of the bearing 56 and a surface formed partly by an adjacent face of an annular shoulder 67 on the casing 50 and partly by the inside face of the bearing nut 60.

By this construction, the sleeve 50 carrying the center 45 is free to rotate within the casing 4, but is prevented from having any longitudinal movement with respect thereto. The construction thus far described provides a rotatable center but an additional, more precise centering adjustment is found to be advantageous in many operations to which such a device may be put. In order to provide such precise centering, means is disclosed comprising in this embodiment a spacing ring 70 which bears at one end against the inner ring 63 of the bearing device and which is held in position by an adjusting collar 71 threadably mounted upon the sleeve 50. By screwing the adjusting collar 71 in a direction so as to press the spacing ring 70 against the bearing ring, the bearing ring is forced a short distance along the adjacent tapered portion of the sleeve 50. The result of this limited forcing of the ring 63 along the tapered outside of the casing 50 is to expand the metallic body of the ring slightly due to the great mechanical advantage obtainable by wedge action of the outside tapered portion of the sleeve. By physically expanding the ring in order to reduce the clearance, there is a uniformity of increase in size not made possible with the same precision by any other adjustment. As a result, the slight uniform expansion serves to adjust and reduce the small amount of clearance between the parts comprising the adjustable bearing device 56 a proper amount. Since the centering pin is rotatably mounted, this precise and accurate adjustment of the bearing means by which it is supported, reduces any eccentricities or radial play present in the parts to an absolute minimum, thereby assuring an alinement of the centering pin which is nearly perfect.

There has thus been provided by the novel means described, an adjustable mechanism by means of which the centering pin carried by the tailstock of a machine tool can be precisely and accurately alined within the tailstock, regardless of slight inaccuracies which may be present due to the impracticability of machining the composite parts to an exact dimension.

I claim as my invention:

1. In a machine tool, a centering device comprising a center pin, a sleeve having a bore for reception of the pin and a tapered outside circumference, a supporting casing provided with a bearing means, one portion thereof being secured in the casing and another portion thereof being movable with respect to the first portion and having an internal bore tapered for the reception of the sleeve, there being provided an adjustment on the sleeve for shifting one of said bearing portions with respect to the other portion and to said sleeve to adjust the sleeve and center pin in accurate center alinement.

2. In a machine tool, a centering device comprising a tapered center pin, a sleeve having a tapered bore within for accommodating the pin and a tapered outside circumference, a supporting casing provided with a bearing seat and a bearing means including a first ring secured in the seat and a second ring having an internal bore tapered for reception of the sleeve, there being provided a slight clearance in the connection between said bearing rings and an adjusting means on the sleeve for forcing said second ring along said sleeve to expand said second ring to take up wear in the bearing means and also to tighten said ring on said sleeve.

3. In a machine tool, a centering device comprising a center pin having walls tapered gradually inward from one end, a sleeve having an internal bore tapered to correspond with the pin and an external circumference having a portion thereof adjacent the outer end tapered gradually inward, a supporting casing provided with an internal bore having a bearing support therein, and a bearing means comprising an external portion secured in the bearing support of the casing, an internal portion having a bore tapered to correspond with the tapered circumference of the sleeve and bearings positioned between the portions with a slight amount of clearance, an adjustable collar mounted on the sleeve having lateral contact with the internal portion of the bearing means and adapted to shift said inner portion along the sleeve to alter said slight amount of clearance in order to effect a precise centering of the center pin.

4. In a machine lathe, a tailstock provided with a centering device comprising a center pin having walls gradually tapered inward from one end, a sleeve having an internal bore tapered to correspond with the pin and an external shoulder on the outside circumference, a portion of said circumference being tapered from the shoulder gradually inward, a supporting casing provided with an internal bore having an annular shoulder therein, and a bearing means for the sleeve adjacent the shoulder comprising an external ring having a cylindrical surface received in the bore of the casing and an internal cylindrical bearing surface, an internal ring having a tapered bore to correspond with the tapered portion of the circumference of the sleeve and shiftable therealong, and an outer cylindrical bearing surface, and roller bearings interposed between said rings, a nut threaded into said casing securing said external ring fixedly in the bore, and means threaded on the sleeve including a collar in lateral contact with the internal ring, operable to shift said ring along said sleeve to take up any play in the bearing means by expansion of said internal ring.

5. In a machine tool, a centering device comprising a center pin, a sleeve having a bore for reception of the pin and having a tapered outside circumference, a supporting casing, a bearing means within the casing including portions separated by a slight clearance, a first one of said portions being secured in the casing and a second one of said portions comprising an integral body movable with respect to the first portion, and provided with an internal bore tapered for the reception of the sleeve, an adjusting means on the sleeve for shifting said second portion along the tapered sleeve in order to physically expand said portion to change the slight amount of clearance in the bearing means, thereby to adjust the sleeve and centering pin in accurate center alinement.

BENGT R. GRANBERG.